United States Patent

Hoffman et al.

[11] 3,841,490
[45] Oct. 15, 1974

[54] REFRIGERANT FILTER-DRIER

[75] Inventors: John E. Hoffman, Webster Groves; Ardell J. Schelich, Washington, both of Mo.

[73] Assignee: Sparlan Valve Company, St. Louis, Mo.

[22] Filed: Aug. 8, 1973

[21] Appl. No.: 386,650

Related U.S. Application Data

[63] Continuation-in-part of Ser. No. 231,198, March 2, 1972, Pat. No. 3,815,752.

[52] U.S. Cl. ............... 210/266, 55/316, 55/387, 210/282, 210/287, 210/485, 210/DIG. 6
[51] Int. Cl. ............................................. B01d 27/02
[58] Field of Search ............... 55/316, 387–389; 210/266, 282–284, 287–289, 356, 483–485, 509, DIG. 6

[56] References Cited
UNITED STATES PATENTS

| | | | |
|---|---|---|---|
| 1,839,350 | 1/1932 | Slagel | 210/266 X |
| 2,199,258 | 4/1940 | Gray | 55/316 X |
| 2,556,292 | 6/1951 | Newcum | 55/316 |
| 3,308,957 | 3/1967 | Klein | 210/266 |
| 3,310,176 | 3/1967 | Ziherl et al. | 210/266 |
| 3,347,387 | 10/1967 | Balogh | 55/316 X |
| 3,348,692 | 10/1967 | Balogh | 55/316 X |
| 3,555,787 | 1/1971 | Lustig | 55/316 X |

*Primary Examiner*—Samih N. Zaharna
*Assistant Examiner*—Robert H. Spitzer

[57] ABSTRACT

A filter-drier for refrigeration systems which includes a foraminous canister located in a housing, the housing having an inlet at one end and an outlet at the other end, and the canister engaging the housing adjacent the housing inlet to assure flow through the canister. An adsorbent material bed is contained in the canister. An elongate hollow wire form is disposed in the housing downstream of the canister and adsorbent material bed, the wire form having one end arranged toward the housing outlet and its other end disposed toward the canister. Disposed in the wire form and assuming substantially its shape, is a filter media of inorganic fibrous material, the wire form and filter media engaging the housing adjacent the housing outlet to assure flow through the filter media. The canister is peripherally spaced from the housing to provide a longitudinal flow channel therebetween to increase flow capacity. In the preferred embodiment, the wire form is a compression spring compressed between the housing and an end closure of the canister. The filter media in the spring extends to and engages the said end closure of the canister. Preferably, the filter media in the spring is of fiberglass having a density within the range of substantially 0.5 grams per cubic inch to substantially 5.0 grams per cubic inch.

7 Claims, 2 Drawing Figures

PATENTED OCT 15 1974

3,841,490

REFRIGERANT FILTER-DRIER

CROSS REFERENCE TO RELATED APPLICATION

This application is a continuation-in-part of prior copending application Ser. No. 231,198 filed Mar. 2, 1972 and entitled "Refrigerant Filter-Drier", now U.S. Pat. No. 3,815,752.

BACKGROUND OF THE INVENTION

This invention relates generally to improvements in a filter-drier for use on refrigeration systems, and more particularly to an improved assembly of the adsorbent material bed and filtering unit within a housing to provide an increased flow capacity and reduced pressure drop through the device.

There are basically two types of refrigerant filter-driers in common use today. One type employs a molded desiccant core which serves to remove moisture and acts as a filter media for filtration. The other type employs a bed of granular desiccant retained by perforated metal or fiberglass filter pads under spring pressure. The outlet end of the desiccant bed has a flat pad of fiberglass.

The molded core requires a large filtering area to effectively collect a large amount of dirt. The molded core is inherently expensive to manufacture because of the careful processing required in molding. Manufacturers of low cost, unitary air conditioning equipment require a filter-drier that is much less expensive than the core type presently on the market. The granular desiccant type, while less expensive, has not met this need because of several problems in performance.

The typical spring-loaded design with granular desiccant and fiberglass pad suffers from two severe problems. First, the fiberglass pad at the outlet end has a small area and therefor does not collect a large amount of dirt before blockage occurs. Furthermore, regardless of how the desiccant is held, some breakdown by attrition occurs. These desiccant fines then plug the outlet filter pad.

Some prior devices require that refrigerant flow through substantially the entire longitudinal length of the desiccant bed. When the pad through the desiccant bed is long, considerable pressure drop through the desiccant bed is caused. As a result, this type of drier which may be suitable for one size of refrigeration unit, may not be suitable for the next larger size refrigeration unit.

SUMMARY OF THE INVENTION

The present filter-drier has a relatively inexpensive construction and yet one that is a highly effective filter. The filter-drier can be easily assembled, and is simple in construction with few parts.

A large primary outlet fiberglass filter media presents a large area for filtration and is much more effective in collecting a large amount of dirt and desiccant fines than a molded drier core or the small area provided by flat fiberglass pad.

In the filter-drier, a foraminous canister is located in a housing that has an inlet at one end and an outlet at the other end. The canister engages the housing adjacent the housing inlet to assure flow through the canister. An adsorbent material bed is contained in the canister. An elongate hollow wire form is disposed in the housing downstream of the canister and adsorbent material bed, the wire form having one end arranged toward the housing outlet and its other end arranged toward the canister. A filter media of inorganic fibrous material is disposed in the wire form and assumes substantially the shape of the wire form. The wire form and filter media engages the housing adjacent the housing outlet to assure flow through the filter media. The canister is peripherally spaced from the housing to provide a longitudinal flow channel therebetween to increase the flow capacity.

The reason for the increase in flow capacity is that the refrigerant flows through only the inlet corner of the adsorbent material bed and then flows longitudinally along the flow channel between the canister and the housing until it passes through the filter media. This increased flow capacity eliminates the necessity of upgrading the filter-drier size to accommodate larger sizes of refrigeration units that had heretofore been required and therefore results in a substantially economic advantage.

The foraminous canister includes a peripheral wall and a closed end closures, one end closure engaging the housing adjacent the housing inlet. The wire form is a compression spring compressed between the housing and the other end closure of the canister. The filter media extends to and engages the said other end closure of the canister.

Preferably, the filter media contained and located in the spring is of fiberglass having a density within the range of substantially 0.5 grams per cubic inch to substantially 5.0 grams per cubic inch.

DESCRIPTION OF THE PREFERRED EMBODIMENT

Figure 1:
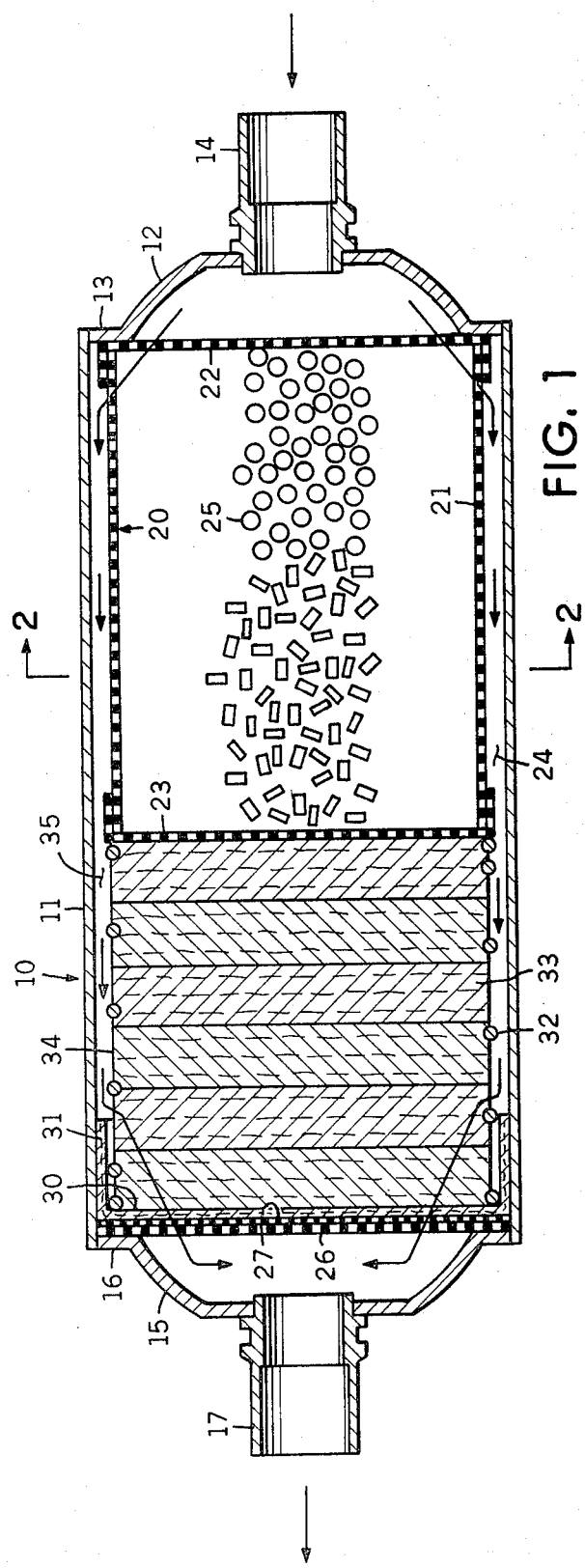
FIG. 1 is a longitudinal, cross-sectional view of the filter-drier.
Figure 2:
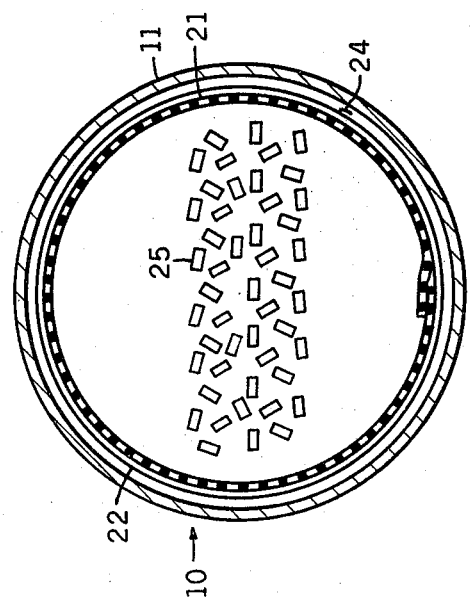
FIG. 2 is a cross-sectional view taken on line 2—2 of FIG. 1.

Referring now by characters of reference to the drawing, it will be understood that the housing generally indicated by 10 of the filter-drier consists of an elongate, cylindrical tubular body 11. One end of the housing body 11 is closed by an inlet housing section 12, the housing section 12 including a peripheral flange 13 secured to the end of the housing body 11. An inlet, tubular fitting 14 is secured to the housing section 12 and communicates with the interior of the housing body 11, the inlet fitting 14 being adapted for attachment to a refrigeration line of a refrigeration system.

The opposite end of the tubular body 11 is closed by an outlet housing section 15, the housing section 15 including a peripheral flange 16 secured to its associated end of the tubular body 11. An outlet fitting 17 is secured to the outlet housing section 15 and communicates with the interior of the housing body 11, the outlet fitting 17 being adapted for attachment to a refrigeration line of a refrigeration system.

Located within the housing body 10 is an elongate canister generally referred to by 20, the canister 20 being constructed of a foraminous material such as a wire screen or mesh. The canister 20 includes a peripheral wall 21 and opposed, cut-shaped end closures 22 and 23. When disposed in the housing body 11, the end closure 22 engages the flange 13 of the inlet housing section 12 to assure flow of refrigerant through the canister 20. Importantly, the canister 20 is spaced peripherally from the housing body 11 to provide a longitudinal flow channel 24 therebetween to increase the flow capacity and reduce the pressure drop through the filter-drier.

Disposed within the foraminous container 20 is an adsorbent material bed 25. This bed 25 can consist of molecular sieve because of its high water capacity. In some usages of the filter-drier, it is advantageous to provide a percentage of activated alumina because of its acid removal capability and/or a percentage of activated charcoal because of its wax removal capability. Other possible desiccants with good attrition resistance which would be satisfactory includes silica gel, sovabead and any other desiccant in ball or bead form. Granular desiccants such as charcoal which have sharp corners may not be satisfactory because of possible breakdown by attrition in service.

Located in the housing body 11 adjacent the housing outlet, is a perforated disc 26 and an adjacent 100-mesh screen 27. The disc 26 and screen 27 are seated against the flange 16 of the outlet section 15.

A pad 30 of inorganic fibrous material such as fiberglass is located across and against the screen 27, the pad 30 including an inturned peripheral flange 31 that engages and is pressed against the inside of the housing body 11.

Disposed in the housing body 11 is a substantially cylindrical, wire form 32 which extends between and engages the housing 10 through the pad 30 and the end closure 23 of canister 20. Specifically, the wire form 32 is a compression spring held and compressed between the flange 16 of the outlet housing section 15 and the canister end closure 23. The spring serves the purpose of holding the canister 20 securely in place by pressing the canister end closure 22 against the flange 13 of the inlet housing section 12.

Located in the wire form 32 is a filter media 33 of an inorganic fibrous material such as fiberglass, the filter media 33 being contained in the wire form 32 and assuming substantially its cylindrical shape. This filter media consists of a plurality of individual fiberglass discs 34 stacked in face-to-face relation and extending substantially between and engaging the fiberglass pad 30 and the canister end closure 23. The filter media 33 provides a large primary outlet filter area downstream of the adsorbent material bed 25 through which the refrigerant must pass. Importantly, the wire form 32 and the filter media 33 are laterally and angularly spaced from the tubular body 11 upstream of the pad 30 to provide a flow channel 35 communicating with and forming a continuation of the flow channel 24.

The filter media 33 can be composed of materials other than fiberglass, although fiberglass is preferred. For example, inorganic fibrous material such as rock wool, bronze wool, copper wool, lead wool, steel wool, stainless steel wool and aluminum wool would be satisfactory under certain conditions. The use of these materials would give significant variations in the filtering ability because of the variation in the fiber size, density and ability to pack these various materials.

It has been found that varying the density of the fiberglass has a direct effect upon the filtering capability of the unit. By changing the size of the fiberglass pads 34 used to form this filter media 33 or by keeping the same size pad and changing the density of the basic fiberglass sheeting, the density of the fiberglass within the confined space of the filter-drier can be controlled. It has been found that best results are obtained within the range of 0.5 to 5.0 grams per cubic inch density of the fiberglass. For example, tests show that at 2.3 grams per cubic inch fiberglass density, a dirt capacity of 10 grams and a filtration efficiency of 90 percent is achieved. When the amount of fiberglass is increased up to 5.1 grams per cubic inch, the dirt capacity drops to 5.3 grams and the filtration efficiency increases to 95 percent. It is clear that the filtration capability of this filter media 33 can be varied by preselecting the density. In certain circumstances, one may be able to permit some dirt particles to go through, but wish to collect a large amount before plug-up. Under these circumstances, the 3.2 grams per cubic inch would be ideal. Using a higher density decreases the amount of dirt collected before plug-up, but increases the amount of dirt removed in one pass through the filter. The 0.5 to 5.0 grams per cubic inch density is a preferred range.

The outlet disc 26 and screen 27 could be of many different porous filter means such as perforated metal, sintered metal and the like. Such outlet filter means should have sufficient strength to bridge the housing outlet section 15 and must be capable of collecting small fibers of the filter media 33 and pad 30 that might be loosened.

When the filter-drier is connected in a refrigeration line, the refrigerant flows into the inlet housing section 12 through the fitting 14, and then flows through only the inlet corner of canister 20 and of the adsorbent material bed 25 contained in the canister, and then flows directly into the flow channel 24 between the canister 20 and the housing body 11. The refrigerant flows from the flow channel 24 into its continuation flow channel 35 until the refrigerant passes through the filter media 33, and then flows through the screen 27 and perforated disc 26 and outwardly of the outlet housing section 15 through outlet fitting 17.

The adsorbent material bed 25 removes contaminants such as water, acid and wax. The filter media 33 removes contaminant particles. The filter pad 30 serves as a secondary filter and collects loose glass fibers which might easily come loose from the cut edge of the discs 34 comprising the filter media 33. The pad 30 performs this last function effectively because it is flat, and because the glass fibers comprising the pad 30 are oriented across the final outlet screen 27 instead of being disposed endwise. Any loosened fibers of the filter media 33 and the pad 30 are also retained by the screen 27.

The flow pattern of the refrigerant does not affect the amount of moisture removed but only reduces the rate of moisture removal because the refrigerant flows only through a limited portion of the adsorbent material bed 25. However, there is moisture transfer between the desiccant particles within the bed 25, and the difference in attaining an equilibrium moisture level will amount to only a small difference in time. For example, in a canister design that would require refrigerant flow through the entire longitudinal dimension or length of the adsorbent material bed, moisture equilibrium might be achieved in two hours, whereas moisture equilibrium might take twelve hours in the present design. Obviously, for a refrigeration or air conditioning system in which the refrigerant is continuously recirculated, this difference of a few hours moisture equilibrium is not significant. The amount of moisture removed is the same. Moreover, the presently described filter-drier can be utilized on refrigeration and air conditioning applications where high flow rate is important.

We claim as our invention:

1. A filter-drier for refrigeration systems, comprising:

a. a housing having an inlet at one end and an outlet at the other end,
   b. a foraminous canister located in the housing, the canister having one end engaging the housing adjacent the housing inlet to assure flow through the end of the canister,
   c. a loose granular adsorbent material bed engaging and contained in the canister,
   d. an elongate, hollow wire form disposed in the housing downstream of the canister and adsorbent material bed, the wire form having one end arranged toward the outlet and its other end disposed toward the canister,
   e. a filter media of inorganic fibrous material disposed in the wire form and assuming substantially the shape of the wire form, the wire form and filter media having one end engaging the housing adjacent the housing outlet to insure flow through the filter media, and
   f. the canister being peripherally spaced from the housing downstream of the canister end engaging the housing to provide a longitudinal flow channel therebetween to increase flow capacity by having flow through the canister end and then through only a portion of the longitudinal dimension of the adsorbent material bed in the canister and then into the flow channel and then through the filter media.

2. A filter-drier as defined in claim 1, in which:
   g. the filter media is peripherally spaced from the housing downstream of the canister to provide an uninterrupted continuation of the flow channel.

3. A filter-drier as defined in claim 2, in which:
   h. the longitudinal flow channel extends from the said one canister end engaging the housing to the said one wire form and filter media end engaging the housing.

4. A filter-drier as defined in claim 3, in which:
   i. the wire form and filter media extend to and engage an opposite end of the canister.

5. A filter-drier as defined in claim 4, in which:
   j. the wire form is a compression spring engaging the said opposite end of the canister under compressive spring loading to hold the canister and filter media in place.

6. A filter-drier for refrigeration systems, comprising:

a. a housing having an inlet at one end and an outlet at the other end,
   b. a foraminous canister located in the housing, the canister having a peripheral wall and opposed end closures, one end closure engaging the housing adjacent the housing inlet to assure flow through the end closure of the canister,
   c. a loose granular adsorbent material bed engaging and contained in the canister,
   d. a compression spring disposed in the housing downstream of the canister and adsorbent material bed, the spring being compressed between the housing and the other end closure of the canister to hold the canister in place,
   e. a filter media of inorganic fibrous material disposed in and held by the spring and assuming substantially the shape of the spring, the spring and filter media having one end engaging the housing adjacent the housing outlet to assure flow through the filter media, and the filter media extending to and engaging the said other end closure of the canister, and
   f. the canister, spring and filter media being peripherally spaced from the housing from the canister end closure engaging the housing to the spring and filter media end engaging the housing to provide a longitudinal flow channel therebetween to increase flow capacity by having flow through the said one end closure of the canister and through only a portion of the longitudinal dimension of the adsorbent material bed and then into and along the flow channel and then through a portion of the filter media.

7. A filter-drier as defined in claim 6, in which:
   g. the filter media in the spring is of fiberglass having a density within the range of substantially 0.5 grams per cubic inch to substantially 5.0 grams per cubic inch to obtain optimum dirt capacity and filtration efficiency.

* * * * *

UNITED STATES PATENT OFFICE
CERTIFICATE OF CORRECTION

Patent No. 3,841,490          Dated October 15, 1974

Inventor(s) John E. Hoffman et al

It is certified that error appears in the above-identified patent and that said Letters Patent are hereby corrected as shown below:

In the heading of column 1 of the front page, cancel the name of the assignee "Sparlan Valve Company" and substitute -- Sporlan Valve Company--.

Signed and sealed this 10th day of December 1974.

(SEAL)
Attest:

McCOY M. GIBSON JR.           C. MARSHALL DANN
Attesting Officer             Commissioner of Patents